United States Patent Office 3,388,631
Patented June 18, 1968

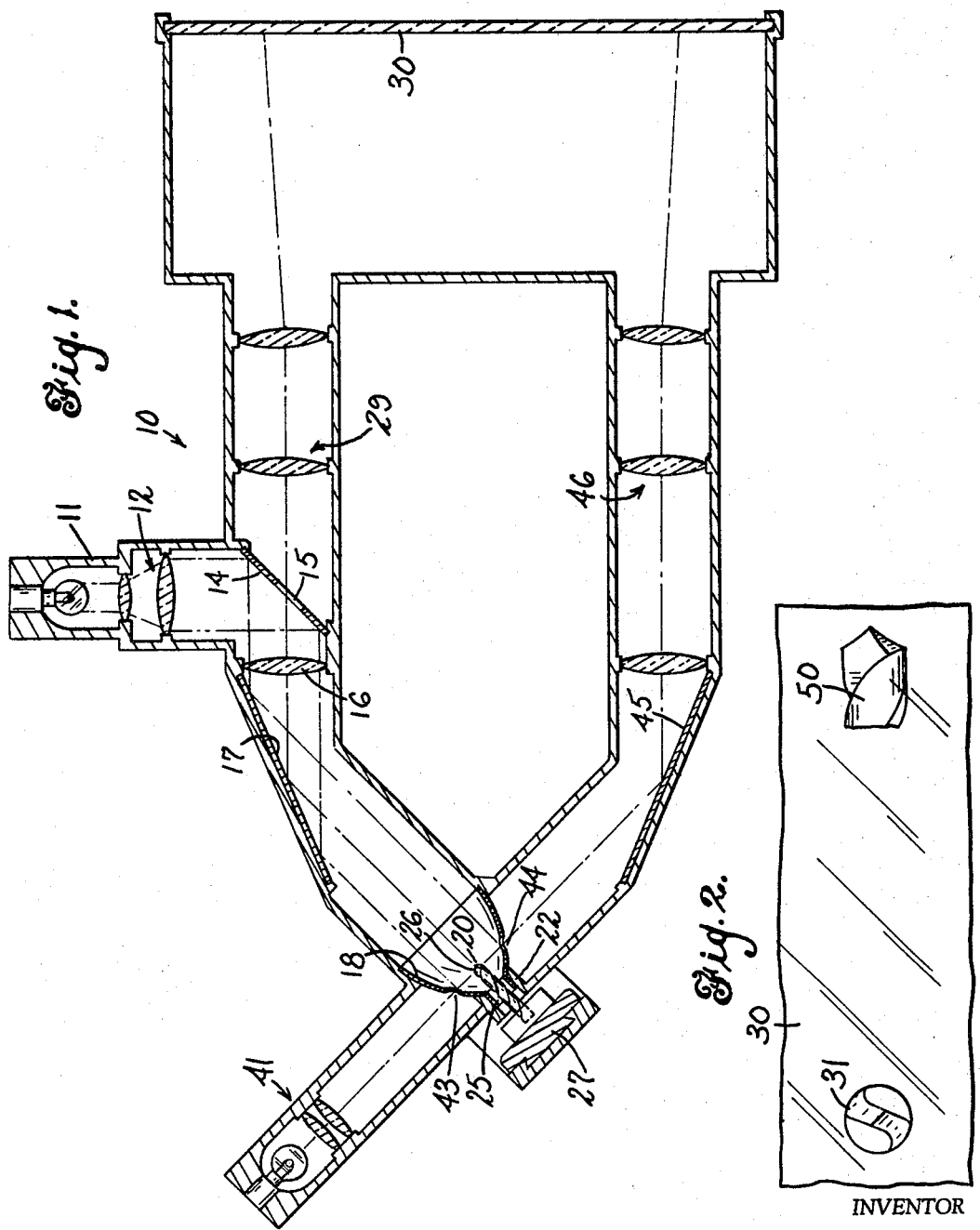

3,388,631
OPTICAL INSPECTION SYSTEM
Michael Glowa, Springfield, Vt., assignor to Textron, Inc., Providence, R.I., a corporation of Rhode Island
Filed Feb. 21, 1966, Ser. No. 529,039
9 Claims. (Cl. 88—24)

ABSTRACT OF THE DISCLOSURE

An optical comparator for simultaneously displaying two views of an object substantially ninety degrees with respect to each other. The comparator consists of a cavity reflector having an inner reflecting surface whereby illumination from a first lamphouse may be directed at a workpiece being inspected, an opening in the rear of the reflector for insertion of the workpiece, and two openings formed in the side of the reflector for passage of light from a second lamphouse. Light from the first lamphouse is directed to the workpiece though a first lens system and the resulting image is reflected by the inner reflecting surface of the reflector back through the first lens system onto a screen, thereby producing a first image of the workpiece. Light from the second lamphouse is directed into the interior of the reflector through one of the openings in the side of the reflector and onto the workpiece. The light rays continue on and pass through the other opening in the side of the reflector through a second lens system and onto the screen, thereby producing a second image of the workpiece substantially ninety degrees with respect to the first image.

---

This invention relates to optical comparator systems and more particularly relates to an arrangement for simultaneously displaying two views of an object substantially ninety degrees with respect to each other.

In order to accurately inspect and measure precision machined parts, industry has adopted the use of optical systems which display enlarged images of the part to be inspected. The enlarged image of the part may then be compared with a known standard to insure that the part meets specifications.

At the present time optical comparator systems generally utilize diascopic or episcopic illumination to generate an image of the part being inspected. In diascopically illuminated comparators, collimated light is projected past an object or workpiece to be inspected and a shadow image or profile of the workpiece is projected by a magnifying lens system onto a viewing screen. In comparator systems using episcopic illumination, a surface of the workpiece is illuminated and the resulting reflected image projected onto a viewing screen. An example of a comparator system utilizing diascopic illumination is disclosed in the patent to Young 2,803,393, and an example of a comparator system utilizing episcopic illumination is disclosed in the patent to Beardsley 2,031,201.

With the advent of sophisticated machines, such as numerically controlled machines for machinery parts such as common twist drills, the drill formed is no longer a crude tool. To insure that the drill meets tolerance limits, it must be inspected to determine that the drill points are symmetrical to a high degree. Additionally, the web thickness, angular position of flutes and drill center lines as well as the profile of the drill must also be inspected.

At the present time the drill is first inspected using diascopic illumination to obtain the profile measurements and is then inspected using episcopic illumination to determine the symmetry of the drill points. Thus, in inspecting a drill, a two-stage technique must be used. The drill must first be staged for diascopic illumination and must then be restaged for episcopic illumination. An example of a system for staging a drill for episcopic illumination to ascertain the symmetry of drill points is disclosed in the patent to Coakley 3,148,582. The two-staging inspection technique therefore not only requires a great deal of time to set up, but requires the operator to use tedious information logging procedures and subsequent correlation procedures to check the information obtained with the two types of views.

Accordingly, to simplify inspection procedures wherein it is required that two views of an object ninety degrees from each other be inspected, applicant has invented a new and improved system which permits an object to be set up such that said two views of the object can be simultaneously displayed.

In view of the foregoing, it is an object of this invention to provide a new and improved optical arrangement for simultaneously inspecting two views of an object.

It is another object of the invention to provide a new and improved optical system capable of simultaneously displaying two views of an object ninety degrees with respect to each other.

It is a further object of the invention to provide a new and improved optical arrangement for simultaneously displaying a profile view including side reflections and a plan view of an object ninety degrees with respect to each other.

It is an additional object of the invention to provide a new and improved optical arrangement for permitting two views of an object ninety degrees with respect to each other to be inspected requiring only a single step to position the object for inspection.

Still other objects and advantages of the invention will in part be obvious and will in part appear hereinafter.

The invention accordingly comprises the features of construction, combination of elements and arrangement of parts which will be exemplified in the construction hereinafter set forth and the scope of the invention will be indicated in the claims.

For a fuller understanding of the nature and objects of the invention, reference is had to the following description taken in conjunction with the accompanying drawing, in which FIG. 1 is a top plan view in section showing the optical comparator system according to the invention; and FIG. 2 illustrates the display of different views of an object being inspected in accordance with the invention.

Referring to the drawing, the comparator according to the invention is shown at 10 and includes a lamphouse 11 and a lens system 12 for providing light rays to illuminate a surface of the object to be inspected. The lamphouse 11 and lens system 12 may be positioned in the erector of the comparator, if desired. The rays emanating from the lens system are directed on a reflector 14, such as a mirror, having an optical aperture 15. The rays reflected from reflector 14 are then directed by a lens 16 and a plain reflecting surface 17, such as a mirror. The reflecting surface 17 is provided for reflecting the illumination and the reflected image of the object from substantially a lateral direction to substantially a sideways direction. The illumination reflected sideways by the surface 17 is then directed into a cavity reflector 18 having an inner reflecting surface which is preferably shaped as a paraboloid of revolution with a focal point 20 within the reflector 18. The paraboloidal reflector 18 supported by support means 22 of the comparator 10, is provided with an opening 25, preferably in the rear thereof, so that an object or workpiece 26, such as a twist drill having a point thereon and held by a staging fixture 27, may be inserted therein.

The workpiece 26 is inserted through opening 25, such that it is preferably positioned at or near the focal point 20 of the reflector 18. The illumination provided from lamphouse 11 is directed at the workpiece 26 being inspected, such that the point of the twist drill which is placed at the focal point 20, produces an excellent reflected image. The resulting image is then reflected by reflector 17 and is transmitted through lens 16, the optical aperture 15 and a focusing lens system 29 onto a comparator screen 30. The image of the workpiece and surface is shown at 31 in FIG. 2 of the drawing.

In order to obtain a second view 90° with respect to the other view according to the invention, there is provided a second lamphouse and a condensing lens system generally shown at 41. The rays of illumination are then directed into the interior of the paraboloidal reflector 18 through opening 43 formed in a side thereof and onto the side of the workpiece 26. The rays which have not been intercepted by the workpiece 26 continue on and pass through a second opening 44 in line of sight with the first opening, thus providing a projected profile of the workpiece. The projected profile is then magnified by a flat reflecting surface 45, such as a mirror, and a focusing lens system 46 and is displayed on the comparator screen 30.

The openings 43 and 44 which are preferably in a plane substantially intersecting the focal point of reflector 18, are of such a small diameter that they do not appreciably affect the view obtained with the other lens system.

In addition to the profile obtained by the use of the openings 43 and 44, there is also obtained a view of the opposite side of the workpiece 26. This view, shown at 50 (FIG. 2) is combined with the profile view and is a result of side reflections from the illumination directed at the point of the workpiece. The side reflections are emitted through the opening 44 and are reflected by reflector 45 and focused by lens system 46 onto the comparator screen 30.

Thus, as can be seen, the workpiece 26 is placed in the common focal plane of the two lens systems to provide two views simultaneously on a comparator screen, the two views being substantially at right angles to each other.

It will thus be seen that the objects set forth above, among those made apparent from the preceding description, are efficiently attained and since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention which, as a matter of language, might be said to fall therebetween.

What is claimed is:

1. An optical comparator system, comprising a cavity reflector with a focal point therein, a first portion of said cavity removed for the insertion of an object therethrough to that the object may be positioned substantially at the focal point of the reflector, said reflector having second and third portions removed to permit illumination to enter into said cavity through one of said second and third portions and exit from the other of said second and third portions, said second and third portions positioned on opposite surfaces of said cavity and said second and third portions lying in a plane passing substantially through the focal point of said cavity reflector, said system including a screen, a first illumination and lens subsystem for providing illumination directed at the sidewalls of said cavity and which may then be reflected to impinge upon an object positioned at the focal point, said first subsystem including means for projecting reflections from the workpiece onto said screen, and a second illumination and lens subsystem for providing illumination into said cavity through said second portion, said second subsystem including means for projecting light emitted from said third portion onto said screen.

2. A system in accordance with claim 1, wherein means are included for positioning the object in the common focal plane of the lens of each of the subsystems.

3. A system in accordance with claim 1, wherein the two subsystems project separate images of the object and which are substantially at 90 degrees with respect to each other.

4. A comparator system for providing two different views of an object, comprising a screen, reflector means having side light openings therein, means for positioning a portion of the workpiece within the confines of the reflector means, means for directing a first light beam at the workpiece positioned within the confines of the reflector, means for retrieving reflections from the workpiece and magnifying the reflections, means for projecting said magnified reflections on the screen to provide a first view, means for projecting a second light beam at the workpiece through side light openings in said reflector means to provide a profile view of the workpiece, means for retrieving the profile view of the workpiece, and means for magnifying the profile view of the workpiece and projecting it on the screen to provide a second view, said first and second views substantially 90 degrees with respect to each other.

5. A comparator system according to claim 4, in which the means for retrieving the profile view also retrieves reflections from said first light beam to magnify and project a combined profile and side view of the workpiece.

6. A comparator system for providing two orthogonal views of a workpiece on a screen, comprising means for supporting a workpiece, means for projecting a first beam of light at said workpiece, means for projecting a second beam of light at said workpiece at an angle of about 90 degrees with respect to the first light beam, means for retrieving light reflections from said first light beam to provide a surface view on a screen, and means for retrieving a profile view of the workpiece and projecting it on said screen, said profile view produced as a result of the second light beam being projected on said workpiece.

7. A comparator system according to claim 6, wherein said means for retrieving and projecting the profile view also retrieves surface reflections provided as result of said first beam being projected on said workpiece, said reflections from said first beam of light combining with said profile to provide a surface view on said screen of a surface of the workpiece orthogonal to said first surface view within the profile view.

8. A comparator system according to claim 6, in which the means for projecting the first beam comprises a mirror having an optical aperture in the center thereof, means for focusing a first light beam on the mirror surface about the aperture, and a second mirror for focusing the first light beam reflected from said first mirror on said workpiece.

9. A comparator system according to claim 8, in which the second mirror retrieves the reflectors of said first light beam from said workpiece and directs said reflections through said optical aperture of said first mirror.

References Cited

UNITED STATES PATENTS

| | | | |
|---|---|---|---|
| 2,664,784 | 1/1954 | Waller | 88—24 |
| 3,184,592 | 5/1965 | Cibie | 240—41.35 |

NORTON ANSHER, *Primary Examiner.*

R. M. SHEER, *Assistant Examiner.*